United States Patent Office 3,560,370
Patented Feb. 2, 1971

3,560,370
MANUFACTURE OF LUBRICATING OIL WITH
THE USE OF NEW CATALYSTS
Alain Billon, Montesson, and Michel Derrien, Rueil
Malmaison, France, assignors to Institut Francais du
Petrole, des Carburants et Lubrifiants, Rueil Malmaison,
France
No Drawing. Filed June 21, 1968, Ser. No. 738,816
Claims priority, application France, June 30, 1967,
112,786
Int. Cl. C10g 13/02
U.S. Cl. 208—111
15 Claims

ABSTRACT OF THE DISCLOSURE

The present disclosure is directed to a catalyst composition used in hydrocracking processes and a process for manufacturing said catalyst compositions which comprises a carrier resulting from the precipitation of alumina gel on particles of silica gel or the precipitation of silica gel on particles of alumina gel and an active component selected from the group consisting of the metals of Groups VI–A and VIII of the Periodic Table.

---

This invention has for its object a new catalyst of the hydrocracking type which may be used for the manufacture of lubricating oils from vacuum distillates or deasphalted residues, i.e., from those petroleum fractions at least 90% by weight of which distill above 350° C. under normal atmospheric pressure.

By varying the nature of the feed oil and the operating conditions, it is possible to obtain with this catalyst:

Bases for engine lube oils with a broad spectrum of viscosities and viscosity indexes (V.I.). It is thus possible to manufacture both bright stocks and spindle oils, with V.I. in the range of about 90 to 150.

Bases for transmission oils which exhibit a high V.I. together with a low pour point and a relatively high flash point.

Bases for transformer oils which also exhibit above characteristics.

It is well-known that the usual hydrocracking catalysts contain metals of the VI–A and VIII groups, usually in the form of oxides or sulfides carried on supports of the silica-alumina type. This support is usually obtained by the coprecipitation of alumina and silica.

However, the thus obtained catalysts are not completely satisfactory for manufacturing lube oils with a high V.I.

The new catalysts according to this invention exhibit a better balance in their cracking-hydrogenating activity, which leads to products with a higher V.I. and to higher yields of these products.

The best catalysts have been obtained in the following way:

(a) Manufacture of a silica gel, for example by hydrolysis of a silica ester or by admixing an acid such as nitric acid with sodium silicate.

(b) Washing the obtained gel, for example with water, in order to lower the content by weight of alkaline compound, expresed as $Na_2O$ below 1%.

(c) Mechanically by suspending the gel, for example by agitation, in an aqueous phase at appropriate pH, for example at about 8–9 and more generally between 7.5 and 11. Preferably the agitation intensity is so ruled as to obtain silica particles in the range of 0.1 to 10 microns.

(d) Introduction, in the thus obtained silica suspension, of an aluminum compound, for example, in the form of sodium aluminate; the thus obtained precipitate of alumina gel preferentially forms on the present particles of silica gel, thus coating the latter; this results into particles of mixed gel.

(e) Separating and washing the particles of mixed gel which result from the previous step.

(f) Introduction, into the mixed gel, of the active elements (metals of the VI–A and VIII groups), for example in the form of oxides or nitrates; this operation is preferably carried out by grinding the particles of mixed gel together with the compounds of metals of the above groups.

(g) Shaping, for example by extrusion.

(h) Drying and activating (for example by heating at a temperature of about 300–600° C.).

It must be pointed out that the hereabove given order of operations is preferential and not obligatory, the essential being that alumina be precipitated on particles of silica gel or conversely silica precipitated on an alumina gel, a coprecipitation of these two oxides being excluded.

However it is preferred that the obtained catalyst exhibit a ratio by weight alumina/silica between 1 and 3.

It is also possible to carry out the washing of step (b) not only with water but with an aqueous phase of slightly basic pH such as described above, the latter phase being usable for suspending silica (step (c)) and precipitating alumina gel in step (d). For example a diluted aqueous solution of ammonia can be used.

Also the introduction of the active elements into the mixed gel (step (f)) may be carried out by the impregnation of the mixed gel with one or several solutions containing these elements, preferably after partial drying.

The catalysts of this invention contain at least 25% and preferably at least 35% of pores with dimensions higher than 0.1 micron, and at least 25% and preferably at least 50% of pores with dimensions lower than 0.1 micron, with respect to the total pore volume. These catalysts preferably contain from 2 to 10% by weight of cobalt or nickel (expressed as CoO or NiO)), from 10 to 30% of molybdenum or tungsten (expressed as $MoO_3$ or $WO_3$), from 5 to 40% of silica and from 22 to 83% of alumina.

Before their use, the catalysts of this invention will be usually subjected to a pretreating, for example, by a hydrogen sulfide containing gas, in order to transform at least partly the metals contained therein to sulfides (the sulfidation temperature is usually between 200 and 500° C.).

To obtain the products hereinbefore defined, the feed stock (vacuum distillate or deasphalted vacuum residue or mixtures thereof) will preferably have a viscosity of 5 to 50 centistokes at 98.9° C., a viscosity index between 20 and 100, a Conradson carbon number lower than 5, contents of nitrogen and asphaltenes each lower than 0.2% by weight, and this feed stock will be contacted with hydrogen in the presence of a catalyst such as herein defined, the hydrogen pressure ($PH_2$) being between 80 and 240 kg./cm.², the temperature between 350 and 440° C., the hourly volumetric rate (V.V.H.) between 0.1 and 2 liters of liquid hydrocarbons per liter of catalyst.

The hydrogen feed rate is advantageously between 500 and 2000 liters per liters of liquid hydrocarbons.

Preferably, starting with a catalyst according to this invention, the operating conditions will be as follows:

100 kg./cm.²<$PH_2$<150 kg./cm.²
0.2<V.V.H.<1 liter/liter/hour
370<temperature<410° C.
800<hydrogen feed rate<1500 liters/liter After hydrorefining, the product is subjected to a distillation wherein the light fractions (light gasoline, naphtha, gas oil) are separated from the lube oil fraction. The latter is thereafter dewaxed at a temperature usually lower than 0° C., for example between −15 and −70° C., with a conventional solvent, preferably methylisobutylketone or a mixture of methylethylketone with toluene in a ratio of 1/1.

This lube oil fraction may be further fractionated into several oil cuts with particular properties adapted to different uses.

The dewaxing may also be carried out only on the oil cuts hereabove mentioned.

For the practical use as lube oils, transformer oils or transmission fluids, these products may be used together with various additives, for example viscosity improvers such as polyisobutenes or methacrylic polyesters.

EXAMPLE 1

The catalyst exhibits the following composition by weight:

| | Percent |
|---|---|
| $Al_2O_3$ | 56 |
| $SiO_2$ | 20 |
| $MoO_3$ | 16 |
| NiO | 8 | this catalyst has been prepared according to the hereabove described process, i.e., adding sodium aluminate (resulting into the precipitation of alumina) to silica gel suspended in an aqueous solution of pH 9, filtrating and washing with water the obtained mixed gel, admixing with molybdenum oxide and nickel oxide, partially drying, extruding and roasting the obtained extrudates to 550° C.

This catalyst exhibits the following textural characteristics:

Specific surface: 250 m.$^2$/g.
Total pore volume: 55 cm.$^3$/100 g.
Microporous volume (<0.1$\mu$): 33 cm.$^3$/100 g. (60%)
Macroporous volume (>0.1$\mu$): 22 cm.$^3$/100 g. (40%)

This catalyst is used to manufacture a heavy oil by hydro refining of a deasphalted vacuum residue, said catalyst being presulfurized by means of $H_2S$ diluted in $H_2$ under the following conditions:

T=320° C. for 6 hours
$H_2S/H_2$=4/100 molar

It will be noted that any other sulfur compound could be used, which may be easily decomposed without carbon formation (methyl sulfide, mercaptans and so on).

The feed stock has the following composition:

$d_4^{20}$: 0.928
S: 2.58% by weight
N: 800 parts per million by weight
Carbon Conradson: 1.80
Viscosity at 98.9° C.: 35.7 cst.
Distillation ASTM-1160: higher than 500° C.

The reaction conditions are the following:

$PH_2$: 120 kg./cm.$^2$
T: 380° C.
V.V.H.: 0.5 liter/liter/hour
Hydrogen rate: 1000 liters per liter Thereafter this is dewaxed with methylethylketone.
The yields are as follows:

$SH_2+NH_3$: 2.8% (by weight)
$C_1+C_2$: 0.17%
$C_3+C_4$: 0.32%
$C_5+C_6$: 0.61%
Gasoline (80–150° C.): 1.73%
Gas oil: 12.72%
Paraffins: 17.50%
SAE 20 oil: 20.13% (viscosity of 8 cst. at 98.9° C.; V.I.=92)
SAE 40 oil: 15.00% (viscosity of 15.5 cst. at 98.9° C.; V.I.=95)
Heavy oil: 30.5% (viscosity of 32 cst. at 98.9° C.; V.I.=103)

The obtained oils exhibit a high purity. Thus the heavy oil contains only 0.07% by weight of sulfur, 2 parts per million by weight of nitrogen and exhibits a Conradson carbon figure of 0.06.

EXAMPLE 2

There is manufactured a base for multigrade oil from the feed stock described in Example 1, using the same catalyst.

The operating conditions are as follows:

$PH_2$: 120 kg./cm.$^2$
V.V.H.: 0.5 liter/liter/hour
T: 400° C.
Hydrogen rate: 1000 liters/liter The yields are the following in percent by weight:

$H_2S+NH_3$: 2.84
$C_1+C_2$: 0.42
$C_3+C_4$: 1.62
$C_5+C_6$: 2.60
Gasoline (80–150° C.): 6.20
Gas oil: 38.22
Paraffins: 8.00
Lube oil: 42.20 (viscosity at 98.9° C.:8 centistokes; V.I.: 125)

The content of impurities of this oil is low:

S<0.01% (by weight)
N<1 part per million
Conradson carbon<0.02

EXAMPLE 3

There is manufactured a base for transmission fluid by hydro-refining of a light distillate of normal boiling range 400–500° C., in the presence of the above described catalyst.

The operating conditions are as follows:

$PH_2$: 120 kg./cm.$^2$
V.V.H.: 0.5 liter/liter/hour
T: 415° C.
Hydrogen rate: 1000 liters/liter A fraction of boiling range 300–400° C. is separated by distillation from the reaction product. This fraction amounts to 27% of the feed stock. After dewaxing at −60° C., this fraction exhibits the following characteristics:

$d_4^{20}$: 0.825
Cleveland flash point: 158° C.
Pour point: <−60° C.
Viscosity at −40° C.: 900 cst.
Viscosity at 37.8° C.: 8.5 cst.
Viscosity at 98.9° C.: 2.39 cst.
V.I.: 112

By addition to this cut of a viscosity improver, there is obtained a transmission fluid conforming to the requisites of specification SAE 71 RI, i.e., exhibiting the following properties:

| Composition (percent by weight) | Transmission fluid | SAE 71 RI |
|---|---|---|
| Hydrorefined cut 300–400° | 94.5 | |
| Polyalkyl methacrylate | 5.5 | |
| Characteristics: | | |
| Viscosity at −40° C. (cst.) | 1,556 | <2,000 |
| Viscosity at 37.8° C. (cst.) | 19 | |
| Viscosity at 98.9° C. (cst.) | 5.67 | >5.5 |
| V.I. | 197 | |
| Cleveland flash point, ° C. | 160 | >107 |
| Boiling point, ° C. | 300 | >204 |
| Pour point, ° C. | <−60 | <−57 |

Oxidation test: 96 hours at 150° C.
Air: 15 liters per hour; oil: 50 ccm.
Insoluble in heptane after oxidation: none
Acid number (mg. KOH/g.) after oxidation: 0.10

EXAMPLE 4

There is manufactured, according to the process described in Example 1, a catalyst of the following composition:

$Al_2O_3$: 39% by weight
$SiO_2$: 37% by weight
$MoO_3$: 16% by weight
NiO: 8% by weight The textural characteristics are as follows:

Specific surface: 230 m.$^2$/g.
Total pore volume: 60 cm.$^3$/g.
Microporous volume ($<0.1\mu$): 29 cm.$^3$/g.
Macroporous volume ($>0.1\mu$): 31 cm.$^3$/g.

This catalyst has been presulfided as in Example 1 and it is used to treat the same stock as in this example. The operating conditions are the same except the temperature which amounts to 365° C. instead of 380° C.

After dewaxing with methylethylketone, the following yields are obtained:

$SH_2+NH_3$: 2.30
$C_1+C_2$: 0.10
$C_3+C_4$: 0.25
$C_5+C_6$: 0.60
Gasoline (80–150° C.): 1.55
Gas oil: 10.70
Paraffins: 14.5
SAE 20 oil: 21 (viscosity of 8.3 cst. at 98.9° C.; V.I.=91)
SAE 40 oil: 17 (viscosity of 15.2 cst. at 98.9° C.; V.I.=97)
Heavy oil: 32 (viscosity of 32.6 cst. at 98.9° C.; V.I.=104)

We claim:

1. A process for manufacturing catalysts used for hydrocracking which comprises manufacturing a silica gel, precipitating an alumina gel on the particles of the silica gel thus coating said gel, thereby forming a mixed gel carrier, and introducing into the mixed gel carrier the active components of the catalyst selected from the group consisting of the metals of the Groups VI–A and VIII of the Periodic Table.

2. Process according to claim 1, wherein the particle of silica or alumina gel are in the range of 0.1 to 10 microns.

3. Process according to claim 1, wherein the active components are incorporated into the carrier by crushing.

4. Process according to claim 3, wherein the resulting catalyst is thereafter shaped, dried and roasted.

5. The process of claim 1, wherein the catalyst contains from 2 to 10% by weight of cobalt or nickel, expressed as CoO or NiO, from 10 to 30% by weight of molybdenum or tungsten, expressed as $MoO_3$ or $WO_3$, from 5 to 40% by weight of silica and from 22 to 83% of alumina, at least 25% of the porous volume corresponding to pores of less than 0.1 micron and at least 25% of the porous volume corresponding to pores of less than 0.1 micron, with respect to the total porous volume.

6. The process of claim 5, wherein at least 35% of the porous volume corresponds to pores of at least 0.1 micron and at least 50% of the porous volume corresponds to pores of less than 0.1 micron, with respect to the total porous volume.

7. A process for hydrocracking a hydrocarbon feed stock selected from the group consisting of vacuum distillates, deasphalted vacuum residues and mixtures thereof, wherein the feed stock is treated with hydrogen at a hydrogen pressure of 80 to 240 kg./cm.$^2$ and a temperature of 350–440° C., in the presence of a catalyst comprising a carrier resulting from the precipitation of alumina gel on particles of silica gel or the precipitation of silica gel on particles of alumina gel, and an active component selected from the group consisting of the metals of Groups VI–A and VIII of the Periodic Table.

8. Process according to claim 7, wherein the feed stock has a viscosity between 5 and 50 centistokes at 98.9° C., a viscosity index between 20 and 100, a Conradson carbon number lower than 5, a content of nitrogen lower than 0.2% by weight and a content of asphalt lower than 0.2% by weight, the hourly volumetric ratio being from 0.1 to 2 liters of liquid feed per liter of catalyst.

9. Process according to claim 8, wherein the rate of gaseous hydrogen is 500–2,000 liters per liter of liquid feed.

10. The process of claim 1, wherein, in forming the mixed gel carrier, the alumina gel is first manufactured and a silica gel is precipitated on the particles of the alumina gel, thus coating said gel.

11. The process of claim 1, wherein the catalyst is subsequently shaped, dried and activated at a temperature of about 300 to 600° C.

12. The process of claim 1, wherein the weight ratio of alumina/silica is between about 1 and 3.

13. The process of claim 1, wherein the alumina gel contains about 56% by weight alumina, the silica gel contains about 20% by weight silica and the active component comprises about 16% by weight molybdenum oxide and about 8% by weight nickel oxide.

14. The process of claim 1, wherein the alumina gel contains about 39% by weight alumina, the silica gel contains about 37% by weight silica and the active component comprises about 16% by weight molybdenum oxide and about 8% by weight nickel oxide.

15. The process of claim 7, wherein the catalyst contains from 2 to 10% by weight of cobalt or nickel, expressed as CoO or NiO, from 10 to 30% by weight of molybdenum or tungsten, expressed as $MoO_3$ or $WO_3$, from 5 to 40% by weight of silica and from 22 to 83% of alumina, at least 25% of the porous volume corresponding to pores of at least 0.1 micron and at least 25% of the porous volume corresponding to pores of less than 0.1 micron, with respect to the total porous volume.

References Cited

UNITED STATES PATENTS

| | | | |
|---|---|---|---|
| 2,307,878 | 1/1943 | Connolly | 252—451 |
| 3,140,253 | 7/1964 | Plank et al. | 208—120 |
| 3,308,055 | 3/1967 | Kozlowski | 208—112 |

DELBERT E. GANTZ, Primary Examiner

A. RIMENS, Assistant Examiner

U.S. Cl. X.R.
208—18; 252—455